(12) United States Patent
Auvray

(10) Patent No.: US 6,983,913 B2
(45) Date of Patent: Jan. 10, 2006

(54) SAFETY DEVICE FOR PARACHUTE CANOPY

(75) Inventor: Michel Auvray, Auvers/Oise (FR)

(73) Assignee: Aerodyne International, Luxembourg (LU)

( * ) Notice: Subject to any disclaimer, the term of this patent is extended or adjusted under 35 U.S.C. 154(b) by 0 days.

(21) Appl. No.: 10/740,924

(22) Filed: Dec. 22, 2003

(65) Prior Publication Data

US 2005/0001099 A1 Jan. 6, 2005

(30) Foreign Application Priority Data

Dec. 23, 2002 (FR) .................................... 02 16562

(51) Int. Cl.
  *B64D 17/32* (2006.01)
(52) U.S. Cl. ................................................. 244/151 A
(58) Field of Classification Search ............... 244/143, 244/147, 151 R, 151 B, 151 A; 119/770, 119/771, 772, 15; 2/44–45, 102, 300–342; 182/37; 224/158, 184; 280/290, 801.1; 54/69; 74/2
See application file for complete search history.

(56) References Cited

U.S. PATENT DOCUMENTS

| | | | | |
|---|---|---|---|---|
| 1,877,702 A | * | 9/1932 | St Clair | 24/598.4 |
| 2,406,209 A | * | 8/1946 | Fausz | 244/151 A |
| 2,411,381 A | * | 11/1946 | Manson | 244/151 R |
| 2,983,007 A | * | 5/1961 | Reinhold | 24/200 |
| 3,934,848 A | * | 1/1976 | Snyder | 244/151 A |
| 4,337,913 A | * | 7/1982 | Booth | 244/151 B |
| 4,923,150 A | * | 5/1990 | Calkins et al. | 244/151 B |
| 6,056,242 A | * | 5/2000 | Collins | 244/151 B |
| 6,412,430 B1 | * | 7/2002 | Johnston | 112/475.06 |
| 6,431,495 B1 | * | 8/2002 | Lawyer | 244/149 |

FOREIGN PATENT DOCUMENTS

FR 2 772 339 6/1999

* cited by examiner

*Primary Examiner*—Teri Pham Luu
*Assistant Examiner*—Stephen A. Holzen
(74) *Attorney, Agent, or Firm*—Jacobson Holman PLLC

(57) ABSTRACT

A safety device allowing the detachable connection between a canopy of a parachute and a parachute harness including a series of rings, harness ring, primary ring and secondary ring allowing the reduction of the traction exerted by the parachutist on the harness ring in order to release the canopy. The releasing ring advantageously presents a dimension in one direction greater with respect to any other dimension in any other direction.

11 Claims, 2 Drawing Sheets

SAFETY DEVICE FOR PARACHUTE CANOPY

FIELD OF THE INVENTION

The present invention relates to a safety device allowing the detachable connection between a canopy of parachute type and a parachute harness.

BACKGROUND OF THE INVENTION

In effect, it is sometimes necessary, during a parachute jump, to disengage oneself from one's principal canopy which has, for example, opened badly. Once such release has been effected, the parachutist can then open his emergency parachute.

Such release is also desirable just after a landing under unfavourable atmospheric and/or environmental conditions, for example in wetland, on a tree, an electricity pole, or in the case of strong gusts of wind, in order thus to avoid the parachutist being swept along and/or dragged over the ground, after landing.

The prior art, and more precisely U.S. Pat. No. 4,337,913 and French Patent No. 2 772 339, discloses a safety device allowing the detachable connection between the principal canopy and harness of a parachute, said device comprising:
  a riser, of longitudinal axis (X—X), presenting an upper part connected to said canopy and a primary loop connected to a primary ring;
  a secondary loop, fixed on said upper part of said riser, connected to a secondary ring;
  a flexible thong fixed to said riser and maintained by a cable locking this thong;
  a harness ring fastened to said harness.

The assembly is connected in the manner described hereinafter: the primary ring passes in the harness ring, then is folded on the riser, then the secondary ring is passed in the primary ring and likewise folded on the riser; this secondary ring is maintained by the flexible thong which itself is locked by the locking cable.

The object of the French and U.S. patents differs mainly by the form of the connection of the thong with the riser and the capacity, in the case of the French Patent, of allowing the riser to better oppose elongations due to the absence of weakening of its resistance by the boring for positioning an eyelet.

According to the two Patents mentioned above, the principal canopy of the parachute is thus released by the extraction of the cables locking the two release elements.

Due to the shape of the harness ring, the latter exerts during traction a lever arm on the primary ring which itself exerts a lever arm on the secondary ring which exerts a lever arm on the thong and causes it to be unlocked.

Unlocking of the thong then leads to a release of the riser, and therefore of the canopy.

The device according to the French Patent functions along the same principle as the device according to the U.S. patent.

In the two known devices described hereinabove, during the traction exerted on the harness ring, there is reduction of the effort applied, such reduction being determined by the diameter of the different rings.

The lever arm of each ring is also a function of the diameter of the ring and of the diameter of the torus constituting the ring.

Thus an increase in the reduction and of the lever arm makes it necessary to increase the diameter of the rings and to reduce, or not increase, the diameter of the torus constituting the rings.

Consequently, if it is desired to decrease the intensity of the effort to be applied at the level of the harness in order to be able to release the canopy, the diameter of the different rings must be increased.

This is difficult to effect beyond a certain limit because of the space requirement generated and the relative greater fragility of a ring of large diameter with a torus of small diameter.

Moreover, a large-diameter ring offers an orifice which may allow the undesirable passage of matter that may be detrimental to the correct functioning of the device.

SUMMARY OF THE INVENTION

It is an object of the present invention to increase the reduction and the lever arms, as well as the mechanical strength, without, however, increasing the dimensions of the rings.

The present invention has for its object a safety device allowing the detachable connection between the principal canopy and harness of a parachute, comprising:
  a riser, of longitudinal axis (X—X), presenting an upper part connected to said canopy and a primary loop connected to a primary, so-called release ring;
  a secondary loop, fixed on said upper part of said riser, connected to a secondary ring;
  a flexible thong fixed to said riser and locked by a locking cable;
  a harness ring fastened to said harness.

The primary ring is inserted in the harness ring, the primary ring receiving the secondary ring. The ring assembly thus constituted is maintained in position applied on the riser via the thong locked by the locking cable.

The device is characterized in that said primary ring presents a dimension, in one direction, greater with respect to the dimension in any other direction.

In order to improve reduction of the effort applied, the primary ring is constituted by two semi-circular segments connected by two parallel straight segments. It may also be oval in shape.

In order to improve the resistance of the primary ring to the traction efforts, the primary ring presents a bridge of matter forming a tie, defining first and second slots.

Advantageously, the slots are generally circular and/or semi-circular in shape. For example, the first slot is of semi-circular shape, in the form of a D, and the second slot is circular in shape.

With a view to appropriate use of the device, the primary loop of the riser is associated with said first slot and the diameter of said second slot is greater than the outer diameter of said secondary ring.

Advantageously, the first and second slots have substantially the same diameter.

Advantageously, the primary ring may be provided to be planar or to present two consecutive planes.

BRIEF DESCRIPTION OF THE DRAWINGS

The present invention will now be more readily understood in the light of the following description which in no way limits the invention, reference being made to the accompanying drawings, in which.

DETAILED DESCRIPTION OF THE EMBODIMENTS

For convenience, the device forming the subject matter of the invention is referred to as "primary ring".

In addition, the "locked state" of the riser is understood to mean the state of the riser before the canopy is released, and the "unlocked state" the state when the canopy has been released.

Figure 1:
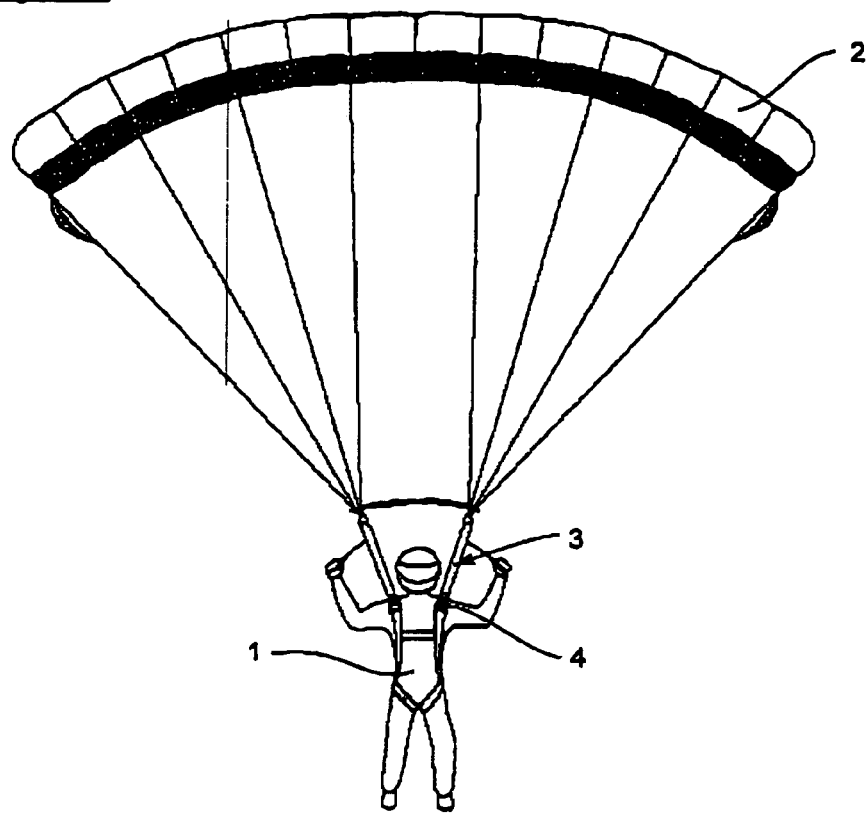
FIG. 1 shows a front view of a parachutist in flight.

FIG. 1 shows a parachutist 1 in flight with his canopy 2 which is connected via a riser 3 to a harness 4.

The riser 3 is known per se and may be of two types, either according to U.S. Pat. No. 4,337,913 or according to French Patent No. 2 772 339.

The device according to the invention may be applied equally well to these two types of riser or to any other type of riser of type known per se allowing the principal canopy of a parachute to be released.

Figure 2:
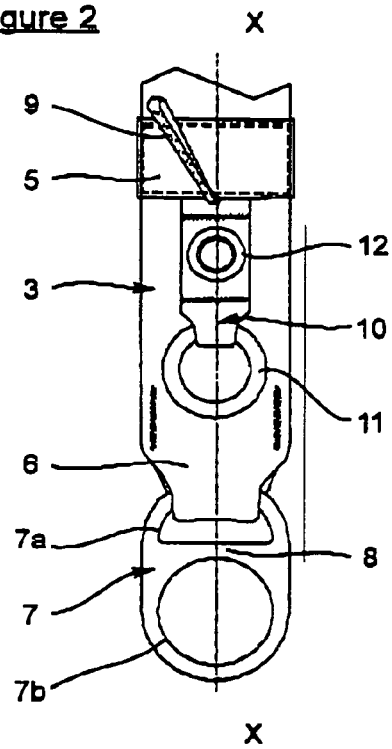
FIG. 2 shows a front view of the device according to the invention with a riser in accordance with the device known by U.S. Pat. No. 4,337,913, not locked.

FIG. 2 shows the riser according to U.S. Pat. No. 4,337,913 with the primary ring according to the invention in an unlocked state.

The riser 3, of longitudinal axis (X—X), is connected to the canopy (not shown in FIG. 2) by its upper part 5 and presents a primary loop 6, associated with a primary ring 7.

The primary ring 7, of oblong shape, presents a first slot 7a and a second slot 7b, as well as a part 8 forming a tie.

The first slot 7a, generally of semi-circular shape, in the form of a D, is associated with the primary loop 6.

According to FIG. 2, the second slot 7b is circular in shape and has a diameter substantially identical to that of the semi-circle of the first slot 7a.

In its upper part, the riser 3 comprises a thong 9 whose function will be explained hereinbelow.

The riser 3 also presents a secondary loop 10 fixed on the frontal surface of the upper part 5 of the riser 3 and associated with a secondary ring 11.

The frontal surface of the riser 3 refers to the surface where the secondary loop 10 and the thong 9 are fixed.

By opposition, the opposite surface of the riser 3 will be referred to as dorsal surface.

Between the upper part 5 and the secondary ring 11, the secondary loop presents an eyelet 12 forming a slot and associated with the primary loop 6.

The eyelet 12 therefore presents a frontal part and a dorsal part.

Figure 3:
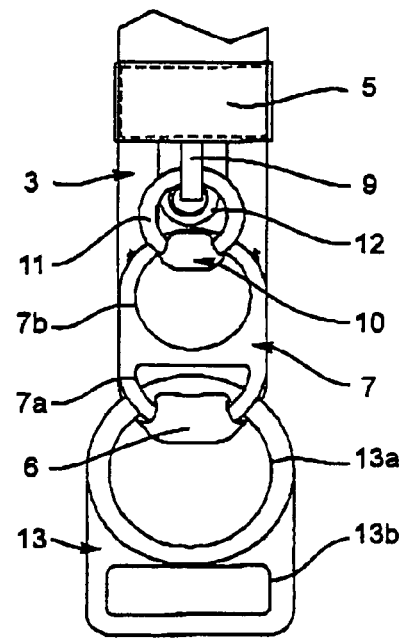
FIG. 3 shows a front view of the device of FIG. 2, the riser being locked.

FIG. 3 shows the riser of FIG. 2, but in the locked state.

In the locked state, the riser 3 is associated with an element 13 called harness ring comprising a first slot 13a and a second slot 13b.

The harness ring 13 is intended to be rendered fast with the harness 4 by any means known to the person skilled in the art.

According to FIG. 3, the first slot 13a of the harness ring is generally circular in shape and the second slot 13b is generally rectangular in shape.

In order to obtain the locked state of the riser 3, the primary ring 7 associated with the primary loop is inserted in the harness ring 13a and folded down on the riser.

The secondary ring 11 associated with the secondary loop is inserted in the slot 7b of the primary ring and folded down on the riser.

Figure 4:
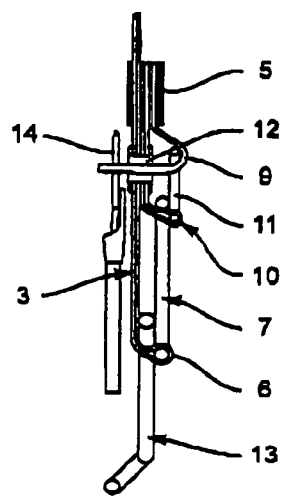
FIG. 4 shows a view in longitudinal section of the riser of FIG. 3.

The secondary ring is maintained in place by the flexible thong 9 which passes through the eyelet 12 and is locked by the cable 14 of known type, shown in FIG. 4 located in the dorsal part of the riser 3.

The diameter of the first slot 13a of the harness ring 13 is larger than the diameter of the second slot 7b of the primary ring 7, whose diameter is larger than the diameter of the secondary ring 11.

Such graduation in the diameters of the different slots of the rings thus allows the insertion of the rings with one another, as explained previously.

FIG. 4 shows a view in lateral section of the riser of FIG. 3.

The flexible thong 9 is passed through the secondary ring 11 and the eyelet 12 in manner substantially perpendicular to the plane defined by the riser 3.

The riser 3 is made of textile material and calculated to withstand the efforts generated by the forces of traction, of known type.

The same applies for the secondary loop 10.

When the riser is in locked position, it is permanently subjected to forces.

In order to unlock the riser 3, the parachutist 1 must exert a force of traction on the locking cable in order to release the flexible thong. Under the permanent effort applied, the secondary ring, having become free, pivots and is disengaged from the primary ring, which itself becomes free and is disenganged from the harness ring.

In this way, the riser 3 and therefore the canopy 2 is no longer connected to the parachutist 1.

The oblong shape of the primary ring 7 brings about an increase in its lever arm and the presence of a tie 8 allows the latter to be much more resistant than a so-called "conventional" ring, i.e. with one sole slot.

In addition, the presence of a tie 8 prevents the pivoting in its plane of the ring in the primary loop 6.

The reduction of force, indispensable in order to be able to release a canopy 2 in flight, is thus increased, while guaranteeing a better safety of the canopy releasing device.

According to a possible application of the invention, the secondary ring may also present first and second slots of the same type as those of the primary ring 7.

Figure 5:
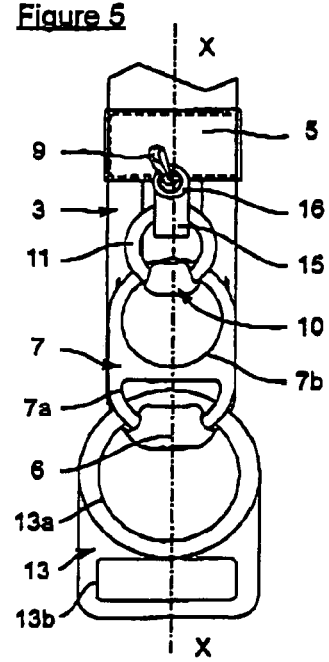
FIG. 5 shows a front view of a riser in accordance with the device known by French Patent No. 2 772 339 in a locked state.

FIG. 5 shows a known riser in accordance with French Patent No. 2 772 339, in a locked state.

Like elements shown in the preceding Figures bear the same reference numbers.

The device according to FIG. 5 presents a riser 3 with a primary loop 6 associated with a primary ring 7 presenting a first (7a) and a second (7b) slot, the first slot 7a being associated with the primary loop 6.

A harness ring 13, comprises a first slot 13a and a second slot 13b, the first slot 13a being generally circular and the second slot 13b generally semi-circular in shape.

The diameter of the first slot 13a of the harness ring 13 is larger than the diameter of the second slot 7b representing the dimension of the primary ring 7 in a direction perpendicular to the longitudinal axis of the riser 3.

The riser 3 presents an upper part 5, connected to a canopy 2 (not shown in FIG. 5), and on which a flexible thong 9 is fixed.

A secondary loop 10, associated with a secondary ring 11, is also fixed on the frontal surface of the riser 3 at the level of its upper part 5.

A tertiary loop 15, presenting an eyelet 16 at its free end, is fixed on the frontal surface of the upper part 5 of the riser 3.

The secondary ring 11 presents an outer diameter smaller than the diameter of the second slot 7b of the primary ring 7.

The tertiary loop 15, of generally rectangular shape, presents a width less than the inner diameter of the secondary ring 11, the eyelet 16 is therefore of diameter smaller than the inner diameter of the secondary ring 11.

The different loops (6, 10, 15) are made of materials adapted to withstand high and known forces of traction.

In order to obtain the locked state of the riser 3, the primary ring 7 associated with the primary loop is inserted in the harness ring 13a and folded down on the riser.

The secondary ring 11, associated with the secondary loop, is inserted in the slot 7b of the primary ring and folded down on the riser.

The secondary ring is maintained in place by the tertiary loop.

Figure 6:
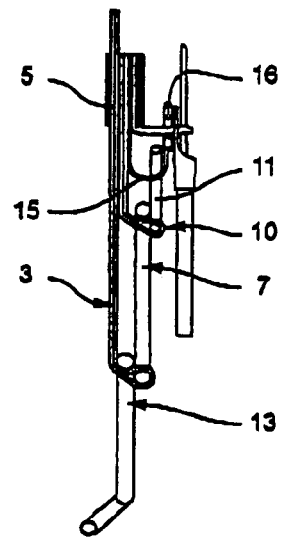
FIG. 6 shows a view in longitudinal section of the riser of FIG. 5.

The tertiary loop, as shown in FIG. 6, is locked via the thong 9 which is inserted in the eyelet 16.

After having passed through the eyelet 16, the thong 9 is locked by a locking cable 14 which is located in the frontal surface of the riser 3.

The canopy 2 is released in the same manner as for the device known from the U.S. patent (FIGS. 2, 3 and 4).

Figure 7:
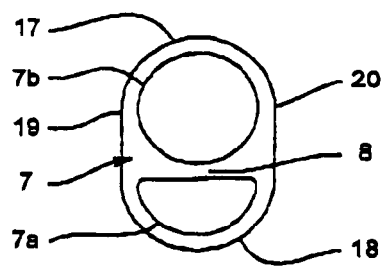
FIGS. 7 and 8 show first and second possible forms of an embodiment of the device according to the invention.

FIG. 7 shows a front view of a possible form of embodiment of a primary ring 7.

In general, the primary ring 7 presents a dimension in one direction greater with respect to the dimension in any other direction.

According to the particular representation of FIG. 7, the primary ring 7 comprises first (7a) and second (7b) slots as well as a tie 8 forming a bridge of matter.

The primary ring 7 is generally oblong in shape, i.e. it presents two identical semi-circular segments (17, 18) connected by two identical parallel, straight segments (19, 20).

The primary ring 7 may also be oval in shape.

The first (7a) and second (7b) slots may be of any appropriate shape.

The first slot 7a is generally circular in shape, and the second slot 7 is generally semi-circular in shape.

Slots may thus be provided, which are triangular, rectangular, pentagonal, hexagonal and so on, in shape.

Figure 8:
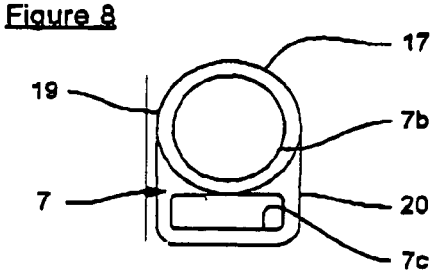
Figure 9:
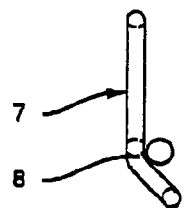
FIG. 9 shows a view in lateral section illustrating the shape of the object of FIG. 8

The primary ring 7 is planar but may, as shown in the front view of FIG. 8 and side view of FIG. 9, present a bent shape.

What is claimed is:

1. Safety device allowing a detachable connection between a canopy of a parachute and a parachute harness said safety device comprising:
    a riser, of longitudinal axis, including an upper part connected to said canopy and a primary loop connected to a primary ring;
    a secondary loop, fixed on said upper part of said riser, connected to a secondary ring;
    a flexible thong fixed to said riser and locked by a locking cable;
    a harness ring fastened to said harness,
said primary ring being inserted in said harness ring, said primary ring receiving said secondary ring, a ring assembly thus constituted being maintained in position applied on said riser via said thong locked by said locking cable, said primary ring including a bridge of matter forming a tie that defines first and second apertures therein.

2. Device according to claim 1, wherein said apertures are one of generally circular and semi-circular in shape.

3. Device according to claim 1, wherein said first aperture is of semi-circular shape, in the form of a D.

4. Safety device allowing a detachable connection between a canopy of a parachute and a parachute harness, said safety device comprising:
    a riser, of longitudinal axis, including an upper part connected to said canopy and a primary loop connected to a primary ring;
    a secondary loop, fixed on said upper part of said riser, connected to a secondary ring;
    a flexible thong fixed to said riser and locked by a locking cable;
    a harness ring fastened to said harness,
said primary ring being inserted in said harness ring, said primary ring receiving said secondary ring, a ring assembly thus constituted being maintained in position applied on said riser via said thong locked by said locking cable, said primary ring including a bridge of matter forming a tie, said bridge of matter forming the tie defining a first aperture and a second aperture, said second aperture being of circular shape.

5. Device according to claim 1, wherein said primary loop is associated with said first aperture.

6. Safety device allowing a detachable connection between a canopy of a parachute and a parachute harness, said safety device comprising:
    a riser, of longitudinal axis, including an upper part connected to said canopy and a primary loop connected to a primary ring;
    a secondary loop, fixed on said upper part of said riser, connected to a secondary ring;
    a flexible thong fixed to said riser and locked by a locking cable;
    a harness ring fastened to said harness,
said primary ring being inserted in said harness ring, said primary ring receiving said secondary ring, a ring assembly thus constituted being maintained in position applied on said riser via said thong locked by said locking cable, said primary ring including a bridge of matter forming a tie, said bridge of matter forming the tie defining a first aperture and a second aperture a diameter of said second aperture is being larger than a diameter of said secondary ring.

7. Safety device allowing a detachable connection between a canopy of a parachute and a parachute harness, said safety device comprising:
    a riser, of longitudinal axis, including an upper part connected to said canopy and a primary loop connected to a primary ring;
    a secondary loop, fixed on said upper part of said riser, connected to a secondary ring;
    a flexible thong fixed to said riser and locked by a locking cable;
    a harness ring fastened to said harness,
said primary ring being inserted in said harness ring, said primary ring receiving said secondary ring, a ring assembly thus constituted being maintained in position applied on said riser via said thong locked by said locking cable, said primary ring including a bridge of matter forming a tie, said bridge of matter forming the tie defining a first aperture and a second aperture, said first and second apertures have substantially a same diameter.

8. Device according to claim 1, wherein said primary ring is planar.

9. Device according to claim 1, wherein said primary ring presents two consecutive planes.

10. Safety device allowing a detachable connection between a canopy of a parachute and a parachute harness said safety device comprising:

a riser, of longitudinal axis, including an upper part connected to said canopy and a primary loop connected to a primary ring;

a secondary loop, fixed on said upper part of said riser, connected to a secondary ring;

a flexible thong fixed to said riser and locked by a locking cable;

a harness ring fastened to said harness, said primary ring being inserted in said harness ring, said primary ring receiving said secondary ring, a ring assembly thus constituted being maintained in position applied on said riser via said thong locked by said locking cable, said primary ring being constituted by two apertures.

11. Device according to claim 10, wherein said primary ring presents a bridge of matter forming a tie.

* * * * *